(12) United States Patent
Madour et al.

(10) Patent No.: US 8,780,856 B2
(45) Date of Patent: Jul. 15, 2014

(54) INTER-SYSTEM HANDOFFS IN MULTI-ACCESS ENVIRONMENTS

(75) Inventors: Lila Madour, Kirkland (CA); Anders Lundstrom, Sollentuna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 874 days.

(21) Appl. No.: 11/856,837

(22) Filed: Sep. 18, 2007

(65) Prior Publication Data

US 2009/0073933 A1 Mar. 19, 2009

(51) Int. Cl.
| H04W 4/00 | (2009.01) |
| H04W 8/26 | (2009.01) |
| H04W 36/00 | (2009.01) |
| H04W 84/04 | (2009.01) |
| H04W 72/04 | (2009.01) |
| H04W 36/14 | (2009.01) |

(52) U.S. Cl.
CPC .............. *H04W 8/26* (2013.01); *H04W 84/042* (2013.01); *H04W 72/04* (2013.01); *H04W 36/14* (2013.01); *H04W 36/0038* (2013.01)
USPC .......................................... 370/331; 370/252

(58) Field of Classification Search
USPC ................... 370/328, 329, 331, 349
See application file for complete search history.

(56) References Cited

U.S. PATENT DOCUMENTS

| 6,671,507 | B1 | 12/2003 | Vinck |
| 7,043,249 | B2* | 5/2006 | Sayeedi .......................... 455/445 |
| 7,359,353 | B2* | 4/2008 | Sayeedi .......................... 370/331 |
| 7,620,017 | B2* | 11/2009 | Sayeedi et al. ................. 370/331 |
| 7,808,951 | B2* | 10/2010 | Choi et al. ..................... 370/331 |
| 7,953,042 | B2* | 5/2011 | Kwak et al. .................... 370/331 |
| 8,009,612 | B2* | 8/2011 | Cherian et al. ................. 370/328 |
| 8,027,309 | B2* | 9/2011 | Kotecha et al. ................ 370/331 |
| 8,289,920 | B2* | 10/2012 | Wang et al. .................... 370/331 |
| 2004/0008632 | A1* | 1/2004 | Hsu et al. ....................... 370/252 |
| 2004/0137902 | A1 | 7/2004 | Chaskar et al. |
| 2006/0109817 | A1 | 5/2006 | Ramanna et al. |
| 2007/0218903 | A1* | 9/2007 | Grech ............................ 455/436 |
| 2007/0258436 | A1* | 11/2007 | Kulkarni et al. ............... 370/352 |
| 2007/0280264 | A1 | 12/2007 | Milton et al. |
| 2008/0259869 | A1* | 10/2008 | Wang et al. .................... 370/331 |

(Continued)

FOREIGN PATENT DOCUMENTS

| EP | 1708423 A1 | 10/2006 |
| WO | 03/049377 A1 | 6/2003 |
| WO | 2007/007990 A1 | 1/2007 |

OTHER PUBLICATIONS

Hesham Soliman, Mobile IPv6 Support for Dual Stack Hosts and Routers (DSMIPv6), MIP6 Working Group, Internet-draft, Oct. 2006.

(Continued)

*Primary Examiner* — Brian O'Connor
(74) *Attorney, Agent, or Firm* — Murphy, Bilak & Homiller, PLLC (57) ABSTRACT

Systems and methods according to these exemplary embodiments provide for methods and systems for handing off user equipment between different access systems, e.g., a high rate packet data (HRPD) system and a long term evolution (LTE) system. Resources to be used in the target system can be allocated prior to breaking the serving radio connection to minimize "break before make" time associated with the handoff.

18 Claims, 10 Drawing Sheets

(56) References Cited

U.S. PATENT DOCUMENTS

| | | | | |
|---|---|---|---|---|
| 2008/0298595 | A1* | 12/2008 | Narayanan et al. | 380/278 |
| 2008/0310323 | A1* | 12/2008 | Shirota et al. | 370/254 |
| 2009/0016300 | A1* | 1/2009 | Ahmavaara et al. | 370/331 |
| 2009/0022104 | A1* | 1/2009 | Cherian et al. | 370/331 |
| 2009/0040982 | A1* | 2/2009 | Ho et al. | 370/331 |

OTHER PUBLICATIONS

R. Samarasinghe et al., Analysis of Intersystem Handover: UMTS FDD & WLAN, London Communications Symposium: University College London, Sep. 8-9, 2003.

J-C. Chen and T. Zhang, Mobility Management, Chapter 4, IP-Based Next Generation Wireless Networks: Systems, Architectures, and Protocols, John Wiley & Sons, 2004, pp. 161-301.

3GPP2 A.S0017-0, Version 1.0, Interoperability Specification (IOS) for CDMA 2000 Access Network Interfaces—Part 7 (A10 and A11 Interfaces) Revision 0 (3G IOSv4.2), Nov. 16, 2001, pp. 1-55.

3GPP TS 23.402 V1.3.0, 3rd Generation Partnership Project; Technical Specification Group Services and System Aspects; Architecture Enhancements for non-3GPP accesses (Release 8), Sep. 2007, pp. 1-84.

J. Loughney et al., Context Transfer Protocol, Internet Draft, Seamoby WG, Aug. 2004, pp. 1-33.

Nortel et al., E-UTRA-HRPD service continuity with optimised handover, 3GPP TSG SA WG2 Architecture—SA2#59. Aug. 27-31, 2007, Helsinki, Finland, pp. 1-7.

J. Kempf, Problem Description: Reasons for Performing Context Transfers Between Nodes in an IP Access Network, Network Working Group, RFC 3374, Sep. 2002, pp. 1-14.

J. Manner et al., Mobility Related Terminology, Network Working Group, RFC 3753, Jun. 2004, pp. 1-36.

* cited by examiner

INTER-SYSTEM HANDOFFS IN MULTI-ACCESS ENVIRONMENTS

RELATED APPLICATION

This application is related to U.S. patent application Ser. No. 11/856,797, also entitled "Inter-System Handoffs In Multi-Access Environments", to Lila Madour, Anders Lundstrom and Samy Touati, filed on the same day as the present application, the disclosure of which is incorporated here by reference.

TECHNICAL FIELD

The present invention relates generally to telecommunications systems, and in particular to methods and systems for performing inter-system handoffs.

BACKGROUND

Radiocommunication networks were originally developed primarily to provide voice services over circuit-switched networks. The introduction of packet-switched in, for example, the so-called 2.5G and 3G networks enabled network operators to provide data services as well as voice services. Eventually, network architecture will evolve toward all-IP networks which provide both voice and data services. However, network operators have a substantial investment in existing infrastructure and would, therefore, typically prefer to migrate gradually to all-IP network architectures to allow them to extract sufficient value from their investment in existing infrastructures. In order to provide the capabilities needed to support next generation radiocommunication applications, while at the same time using legacy infrastructure, network operators will deploy hybrid networks wherein a next generation radiocommunication system is overlaid onto an existing circuit-switched or packet-switched network as a first step in the transition to an all IP-based network.

One example of such a hybrid network involves an existing 3GPP2 radiocommunication system, such as a high rate packet data (HRPD) system, onto which a next generation "long term evolution" (LTE) system is overlaid. As will be appreciated by those skilled in the art, HRPD systems are sometimes referred to by many different names or acronyms. For example, HRPD systems have sometimes been referred to as "high rate data" (HRD) systems or by reference to their air interface standard promulgated by TIA-EIA, i.e., IS-856. The IS-856 standard, entitled "cdma2000® High Rate Packet Data Air Interface Specification (2000)", which is available online at www.tiaonline.org, is incorporated here by reference. Additionally, since HRPD systems use a code division multiple access (CDMA) scheme and evolved from CDMA 2000, they are also sometimes referred to as "1×EV-DO" systems which refers to an "EVolution, Data-Only" version of CDMA 2000. Similarly, LTE systems refer to, for example, next generation (4G) wideband CDMA (WCDMA) systems which are intended to provide improved performance. Although not yet standardized, LTE systems will ultimately be designed in accordance with a new version of the UMTS standards, see, e.g., 3GPP TR 25.913 available online at www.3gpp.org. Target performance goals for LTE systems currently include, for example, support for 200 active calls per 5 MHz cell and sub 5 mS latency for small IP packets.

When an LTE system is overlaid onto an HRPD system, various types of inter-system interoperability will become desirable, one of which is handoff or handover. Inter-system handoff refers to, for example, the process whereby a mobile unit, e.g., a cellular telephone, wireless PDA or laptop, which is currently being supported by a first radiocommunication system is transferred to the support of a second radiocommunication system. In the context of this application, as shown conceptually in FIG. 1, an inter-system handoff of interest involves the transfer of communication support of mobile unit 10 from an HRPD access network 20 to an LTE access network 30 or vice versa. Such handoffs may be performed for a variety of reasons. For example, a mobile unit 10 which is currently being served by the HRPD access network 20 may have moved into a geographic area wherein it can be better served by the LTE access network 30. Alternatively, the inter-system handoff may be performed to provide load balancing between the HRPD access network 20 and the LTE access network 30.

Figure 1:
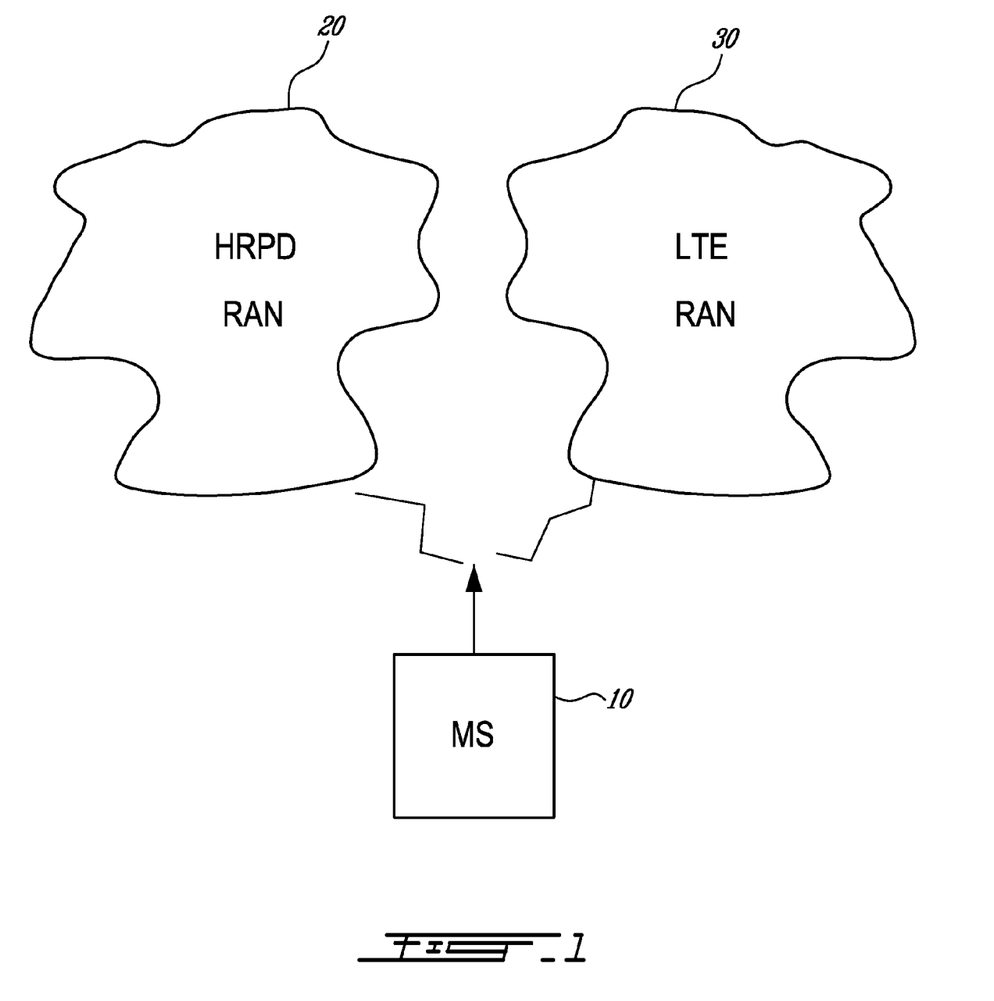
FIG. 1 illustrates handoff of a mobile station between a high rate packet data (HRPD) radio access network (RAN) and a long term evolution (LTE) RAN.

Regardless of the particular reason for the handoff, various signaling needs to be performed in order to complete the transfer of support responsibility for the mobile unit 10 from or to the LTE access network 30. Additionally, unless the mobile unit 10 can simultaneously receive signals from both the HRPD access network 20 and the LTE access network 30, the inter-system handoff will be a hard ("break before make") handoff rather than a soft ("make before break") handoff. For hard handoffs it is further desirable to minimize the intervening time interval during which the mobile station 10 is not connected to either the HRPD access network 20 or the LTE access network 30. Accordingly the exemplary embodiments described herein address the need for mechanisms to facilitate such inter-system handoffs.

SUMMARY

According to one exemplary embodiment a method for communicating information associated with handoff of user equipment (UE) from a first radio access network (RAN) type to a second RAN type includes receiving, at a first node associated with the first RAN type, a request for said handoff, and transmitting, toward a second node in the second RAN type, a first message including at least one of: (a) an IP address associated with a gateway node, (b) an inter-system source access network identifier, and (c) security status information.

According to another exemplary embodiment, an intersystem multi-access node includes a processor for receiving a request for a handoff and transmitting, toward another node a first message including at least one of: (a) an IP address associated with a gateway node, (b) an inter-system source access network identifier, and (c) security status information.

According to yet another exemplary embodiment, a method for communicating information associated with handoff of user equipment (UE) from a long term evolution (LTE) radio access network (RAN) to a high rate packet data (HRPD) RAN includes the step of receiving, at a gateway packet data serving node (GW-PDSN) prior to breaking a first radio connection between said UE and the LTE RAN, an A11 registration request to establish an A10 connection between a target access node in the HRPD RAN and the GW-PDSN.

According to still another exemplary embodiment, a gateway packet data serving node (GW-PDSN) includes a processor for receiving, prior to breaking a first radio connection between a user equipment (UE) and a long term evolution (LTE) radio access network (RAN), an A11 registration request to establish an A10 connection between a target access node in a high rate packet data (HRPD) RAN and the GW-PDSN.

According to another exemplary embodiment, a method for handing off user equipment (UE) from a long term evolution (LTE) radio access network (RAN) to a high rate packet data (HRPD) RAN includes the steps of: maintaining a dormant connection between the UE and the HRPD RAN, transmitting a connection request from the UE to a target access node associated with the HRPD RAN and breaking a first radio connection with the LTE RAN, receiving, from the target access node, an HRPD traffic channel assignment, and tuning, by the UE, to the assigned HRPD traffic channel.

BRIEF DESCRIPTION OF THE DRAWINGS

The accompanying drawings illustrate exemplary embodiments of the present invention, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

As mentioned above, it is desirable to provide mechanisms and methods for handing off connections between an HRPD access network and an LTE access network. Accordingly, to provide some context for this discussion, an exemplary hybrid system 200 which includes both an HRPD (3GPP2) access network 202 and an LTE access network 204 is provided as FIGS. 2(a) and 2(b) and will now be described. For generality, and to facilitate the handoff discussions below, the hybrid system 200 includes both a home public land mobile network (HPLMN) 206 and a visited public land mobile network (VPLMN) 208, as well as various IP networks 210 (e.g., including the Internet) to which the radio networks are connected. Each access network 202 and 204 will include a number of base stations 213 and 212, respectively, as seen in FIG. 2(b) for providing radio access to mobile station 214 via air interfaces 216 and 218, respectively, which are individually specified for the respective access networks. More specifically, the air interface 216 is specified by the above-incorporated by reference IS-856 standard and the as yet to be standardized air interface 218 is expected to include, for example, an orthogonal frequency division multiple access (OFDMA) downlink and a single carrier frequency division multiple access (SC-FDMA) uplink. Notationally, HRPD base stations 206 are typically referred to as "access nodes" (ANs), while LTE base stations 206 are typically referred to as "evolved Node B's" (eNBs). The radio access networks 202 and 204 may, in addition to base stations 206, include other functional entities such as packet control functions (PCFs) which are not shown in FIGS. 2(a) and 2(b) to simplify the illustration.

Returning to FIG. 2(a), the elements of both the HRPD access network 202 and the LTE access network 204 are, according to this exemplary embodiment, connected to an integrated system architecture evolution (SAE) gateway (GW)-user plane entity (UPE)/PDSN 220. The PDSN aspect of element 220 refers to the HRPD element which interconnects the IP networks 210 with the radio access network 202 via an A10/A11 interface or reference point, as well as providing interconnectivity to other PDSNs (not shown) in the HRPD portion of the hybrid system 200. The A interfaces/reference points associated with the HRPD portion of the hybrid network 200 and shown in FIG. 2(a) are specified in, for example, TIA-878-A (A.S0008) and TIA-1878-A (A.S0009), available at www.tiaonline.org, the disclosures of which are incorporated here by reference.

Similarly, the SAE GW-UPE aspect of element 220 refers to the LTE element which interconnects the IP networks 210 with the radio access network 204 via S1 and SGi interfaces, as well as providing interconnectivity to other SAE GWs in the LTE portion of the hybrid system 200, e.g., the home gateway 222. The S interfaces/reference points associated with the LTE portion of the hybrid network 200 and shown in FIG. 2(a) are specified in, for example, the standards document 3GPP TS 23-402. Additionally, SAE GW-UPE/PDSN 220 and SAE GW 223 are connected to integrated home subscriber services (HSS)/authentication, authorization and accounting (AAA) servers 224 and 226, respectively, which are repositories that store data associated with subscribers and use that data to provide various services, some of which will be described below in the context of handoff.

The mobility management entity (MME) 228 is an LTE system entity which manages the distribution of paging messages to the eNBs 212 and which is also involved in handoff signaling according to exemplary embodiments as described below. Moreover, in addition to the S1, S6 and S11 interfaces which interconnect the MME 228 with the LTE RAN 204, HSS/AAA 224 and SAE GW-UPE/PDSN 220, respectively, another interface/reference point has been added according to exemplary embodiments between the MME 228 and the HRPD RAN 202. This new interface, referred to herein as the "Ax" interface, is used as described below to facilitate handoffs of a mobile station 214 between the HRPD RAN 202 and the LTE RAN 204.

Figure 2A:
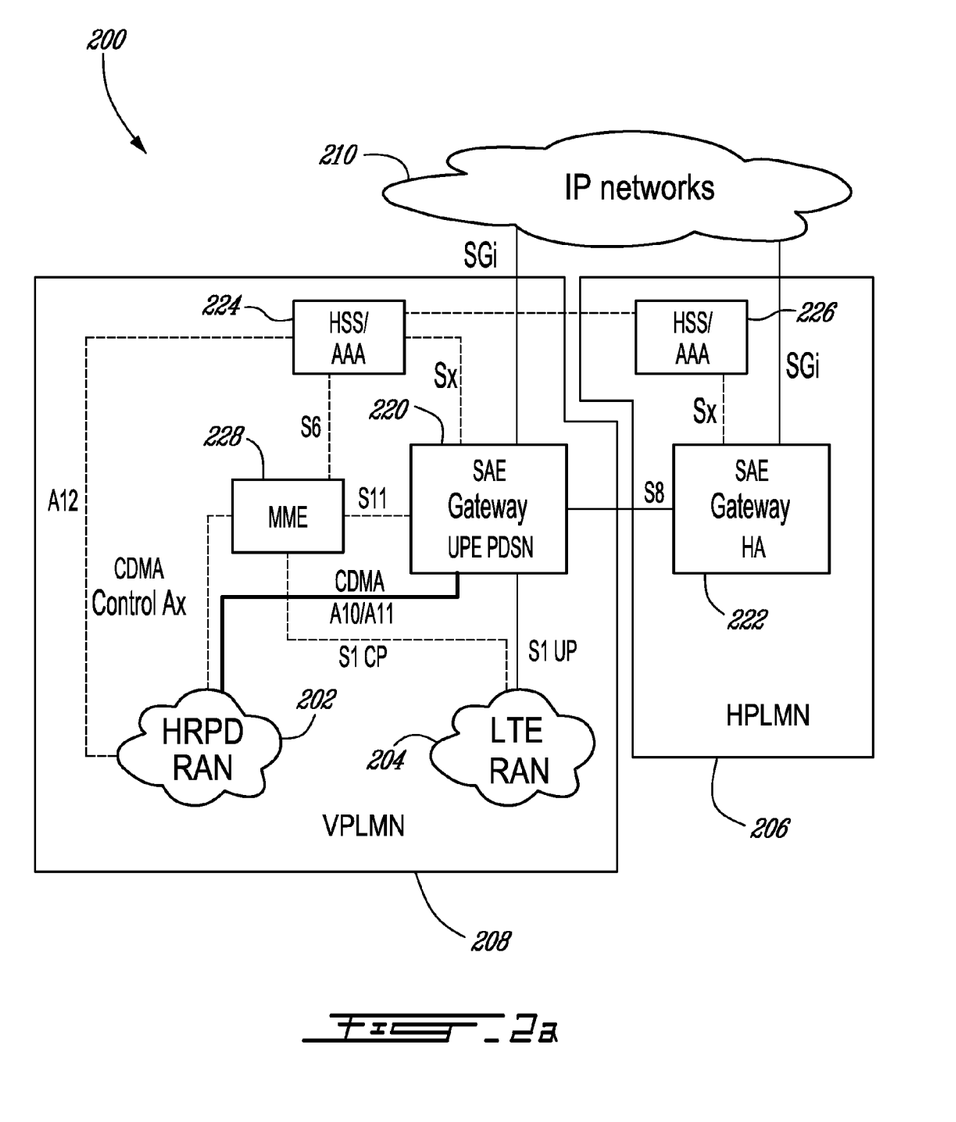
FIG. 2(a) illustrates a hybrid radio access network using an IP Multimedia System (IMS) architecture according to an exemplary embodiment.
Figure 2B:
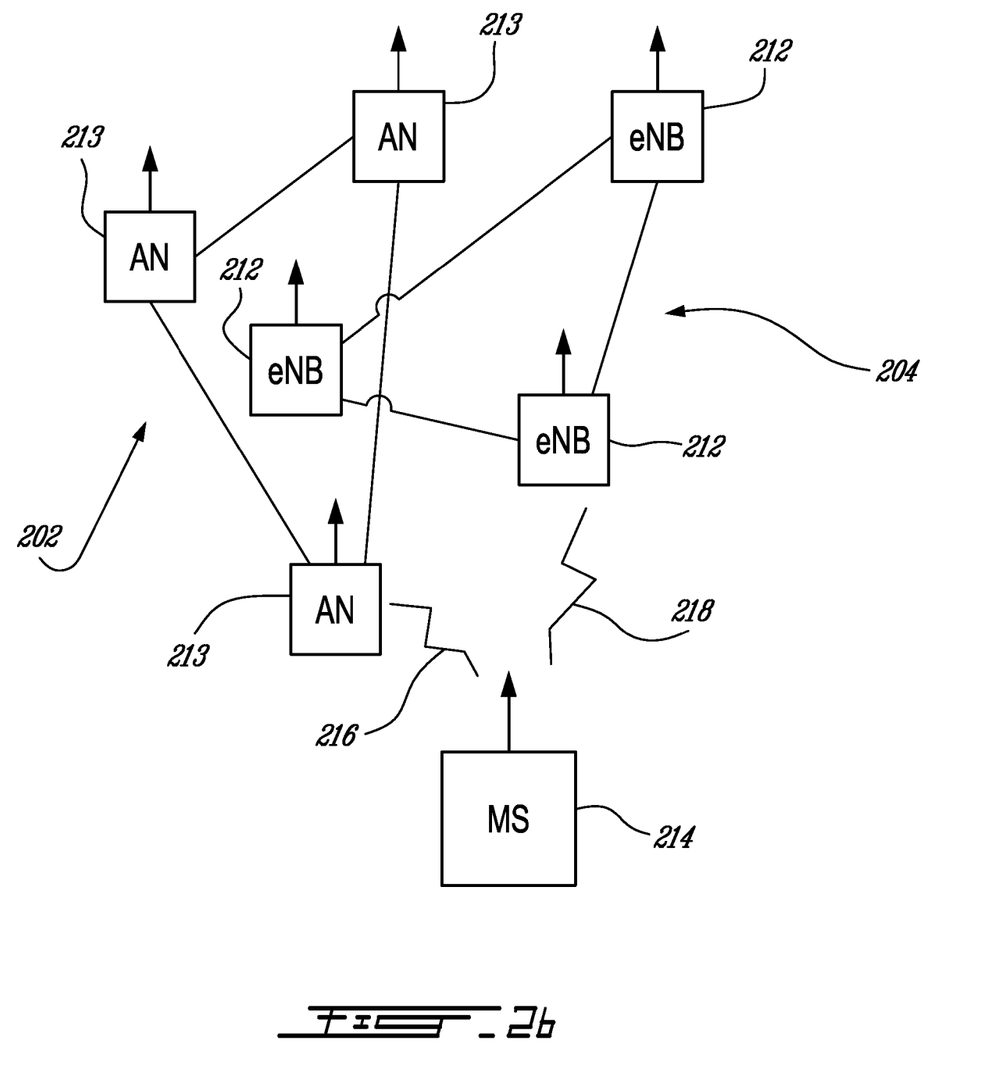
FIG. 2(b) illustrates the exemplary hybrid radio access network of FIG. 2(a) in more detail.

It will be appreciated that the exemplary hybrid system architecture illustrated in FIGS. 2(a) and 2(b) is purely illustrative and that the following exemplary embodiments can be implemented in other architectures. For example, although the exemplary hybrid network 200 illustrates some HRPD system elements being integrated with corresponding LTE system elements, this is not required. In fact, while some exemplary embodiments below describe handoffs in the context of architectures having an integrated SAE GW/PDSN as shown in FIG. 2(a), other exemplary embodiments explicitly contemplate architectures wherein these elements are separated.

According to these exemplary embodiments, signaling is arranged so as to permit one access network (either HRPD or LTE) to prepare resources prior to the handoff of a mobile unit from the other one of these access networks, in order to reduce break time during the handoff. Among other things, this is accomplished by providing the afore-described new Ax interface between the MME 228 and the HRPD RAN 202 and using that interface to convey Layer 2 signals which help prepare resources for an upcoming handoff. For example, as will be described in detail below, the Ax interface can carry an "Inter System Source Access Network Identifier", which contains information that can be used to avoid re-authentication of the UE 214 following intersystem handoff. As another example, a "Security Status" information element can indicate that the terminal has been authenticated in the first network, before handoff, and does not need to be authenticated again. Those skilled in the art will appreciate that other exemplary embodiments could instead transfer the information elements associated with the LTE-to-HRPD/HRPD-to-LTE handoffs described herein via modifications to an existing interface, e.g., the A21 interface, instead of via a new "Ax" interface.

Figure 3:
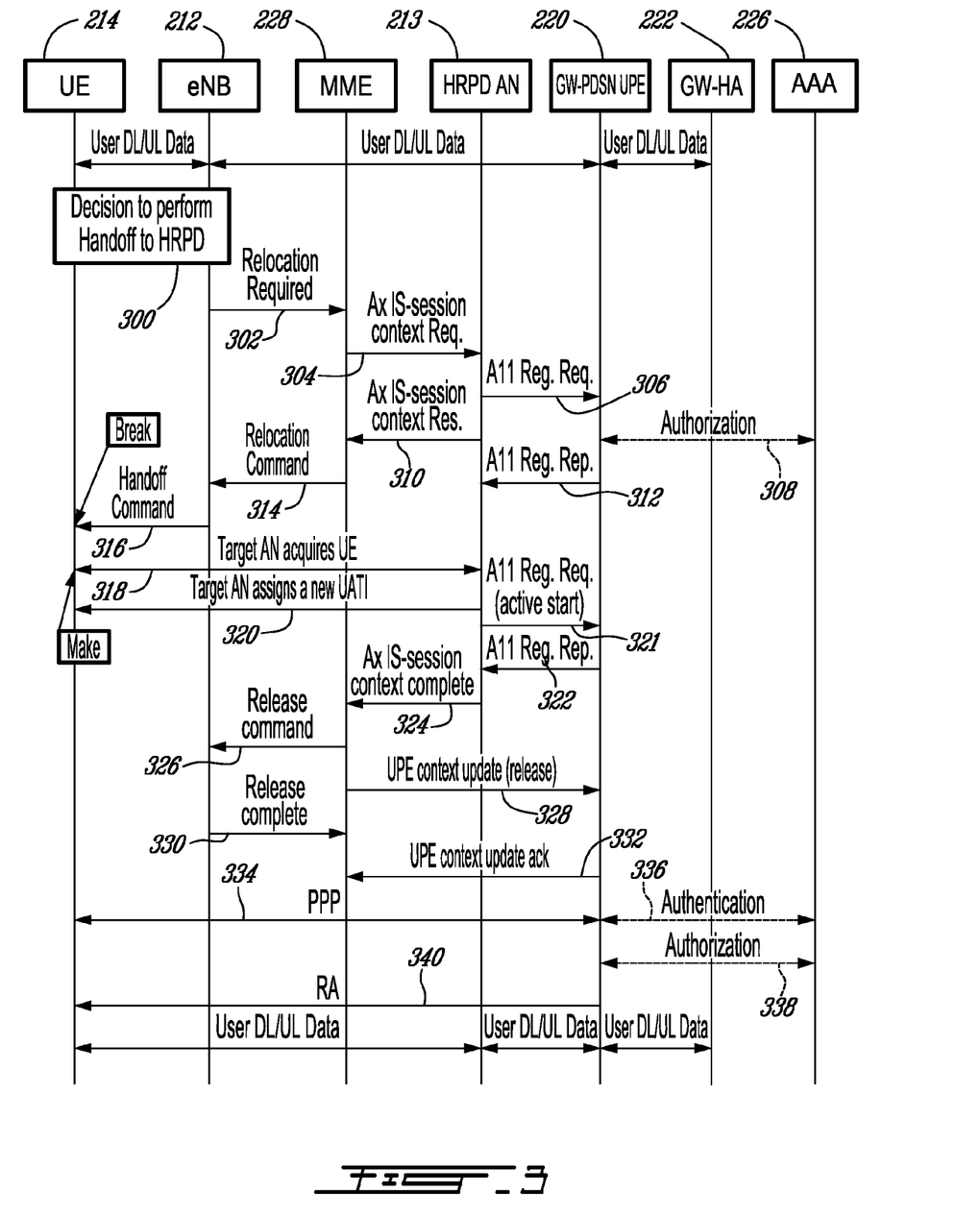
FIG. 3 illustrates signaling associated with a handoff of a user equipment (UE) from an LTE RAN to an HRPD RAN according to an exemplary embodiment.

According to a first exemplary embodiment, an intra-gateway hard handoff of mobile unit 214 can be performed from the LTE RAN 204 to the HRPD RAN 202 using the Layer 2 (link layer) signaling shown in FIG. 3. As will be appreciated by those skilled in the art, the handoff will also involve Layer 3 (network layer) signaling which can be substantially independent of the Layer 2 signaling. An example of Layer 3 signaling for an HRPD-LTE hard handoff can be found in the related application which is incorporated by reference above. Turning now to FIG. 3, the mobile unit (also referred to herein as "user equipment" or "UE") 214 is initially connected to the LTE system via an LTE eNB 212 such that it is sending uplink data thereto and receiving downlink data therefrom. At step 300, a decision is made, either by the system or the UE, to perform a handoff to the HRPD portion of the hybrid system 200, e.g., based upon signal strength or quality measurements. This results in a relocation required signal 302 being sent from the currently serving eNB 212 to the MME 228. According to this exemplary embodiment, the MME 228 then sends an IS session context request message 304 to the target HRPD AN 213 via the Ax interface. Message 304 can include, for example, some or all of the following inter-system information: an ID associated with the UE 214 (MN-ID), serving GW identifier (e.g., an IP address associated with the GW 220 to allow the same GW 220 to be used pre- and post-handoff), an inter-GW handoff address (e.g., an IP address to be used for inter-GW handoff tunnel establishment if the currently serving GW 220 is not available for use post-handoff), an inter-system source access network identifier (ISSANI, e.g., used by the GW 220 to determine if re-authentication of the user is necessary), user equipment capabilities, session status (e.g., information which indicates a session state in the source network such as "LTE active" or "HRPD dormant"), security status (information which indicates that the UE 214 has been authenticated and may be used by the GW 220 to request authorization information from the AAA 226 at A11 establishment), and a target cell identifier.

The information provided in message 304 is selected to optimize handoff between LTE and HRPD systems. Some of the optimizations and uses of this information are mentioned above. Others will be described below with respect to the signaling which follows in FIG. 3. For example, since the GW 220 will not necessarily be aware of the Layer 2 signalling occurring between radio networks, the ISSANI information element provides a mechanism for the GW 220 to determine whether the connection being handed over is associated with an LTE RAN 204 that is part of the same hybrid network 200 (such that no re-authentication is, potentially, required) or part of a different network (such that it might be preferable to re-authenticate the UE 214).

At step 306, the HRPD AN 213 sends a registration request message over the A11 interface to the SAE GW/PDSN 220 to set up the A10 connection. The message 306 can include additional information which the HRPD AN 213 received via message 304 such as the inter-system source access network identifier and security status information described above. This information can be used by the SAE GW/PSDN 220 to take appropriate actions such as (a) maintaining the ROHC (header compression) parameters (no need to negotiate those parameters over HRPD), (b) maintaining the IPv6 prefix or the CoA, so that no MIP registration procedure is required by the UE 214, and/or (c) moving IP and user context information over the new connection. Thus, an A10 connection is established prior to the handoff actually occurring as one of several mechanisms described herein to reduce the time between the "breaking" of the original connection between the UE 214 and the LTE eNB 212 and the "making" of the subsequent connection between the UE 214 and the HRPD AN 213. Optionally, based on the security status information and the inter-system source access network identifier, the SAE GW/PSDN 220 may initiate an authorization request (shown as message 308) to the HSS/AAA server 226 to obtain user profile information (e.g., user QoS profile) and to indicate authorization information on the new access type.

Regardless of whether message 308 is sent for any given handoff, the SAE GW/PSDN 220 sends an A11 registration report message 312 to the target HRPD AN 213 which includes, for example, the QoS profile of the subscriber. Independently of messages/steps 306, 308 and 312, the HRPD AN 213 replies to message 304 with an Ax IS-session context reply message 310 to the MME 228. Message 310 indicates, for example, that the target HRPD AN 213 accepts the handoff and includes an encapsulated version of the handoff command message that will later be transmitted to the UE 214. Passing the handoff instruction as an encapsulated message to be retransmitted enables, for example, the behaviour and state machine associated with processing by the UE 214 to remain unchanged.

Moreover, this enables the MME 228 to continue with handoff preparation during the same time that the A10 connection is being set up (and authorization, if any, occurs). In particular, the MME 228 sends a relocation command 314 to the LTE eNB 212 to which the UE 214 is currently connected. The relocation command 314 includes the encapsulated HRPD handoff command which the MME 228 received via message 310. Thus, the LTE eNB 212 issues the handoff command 316 via the air interface to the UE 214 at which time the UE 214 breaks its connection to the LTE RAN 204. Note that, according to these exemplary embodiments, (1) an A10 connection has been pre-established with the UE 214 before it loses its connection with the LTE RAN 204 and (2) the user's HRPD QoS profile has already been downloaded to the target HRPD AN 213 before the handoff occurs, both of which serve to improve the efficiency of the inter-system handoff process.

Next, as indicated by signals 318 and 320, the target HRPD AN 213 acquires the UE 214 and assigns it to a traffic channel. An A11 registration request (active start) message 321 is sent from the HRPD AN 213 to the GW-PDSN UPE 220 to inform the PDSN that it can deliver traffic directed to this UE to the target HRPD AN 213. At this point, the Layer 2 connection is established and Layer 3 signaling (not shown here, but see, e.g., the above-incorporated by reference patent application) can occur. The GW-PDSN UPE 220 will acknowledge the message 321 via message 322. Next a series of release/completion signals are sent between the various entities, i.e., signals 324, 326, 328, 330 and 332 to inform each of the successful completion of the handoff and permit the initiation of post-handoff procedures, e.g., resource cleanup by the MME 228 for the LTE system resources which are no longer needed by the UE 214.

Signaling 334 is used to provide a point-to-point protocol (PPP) connection for the UE 214 with the IP network(s) 210 (which is performed since the UE 214 is idle in the HRPD portion of the system). Note that, as with other signaling illustrated in the exemplary signal flow diagram of FIG. 3, signaling 334 does not necessarily occur after signals 324-332 simply because it is illustrated below those signals. In fact, the PPP signaling 334 can occur in parallel with signals 324-332, for example, immediately after signal 322 to establish a packet data session between the UE 214 and the gateway 220. An optional authorization process can be performed via messages 336 and 338 associated with the PPP connection (albeit these steps could also be skipped since this is an intra-gateway handoff based upon the previously shared security status information and/or if authorization was previously performed via step 308). After the PPP connection is established, the GW-PDSN UPE 220 informs the UE 214 of this by sending a router advertisement (RA) to the UE 214 including the same prefix used over the LTE access, however the UE 214 is not required to send a new binding update (BU) to the GW HA 222.

Figure 4:
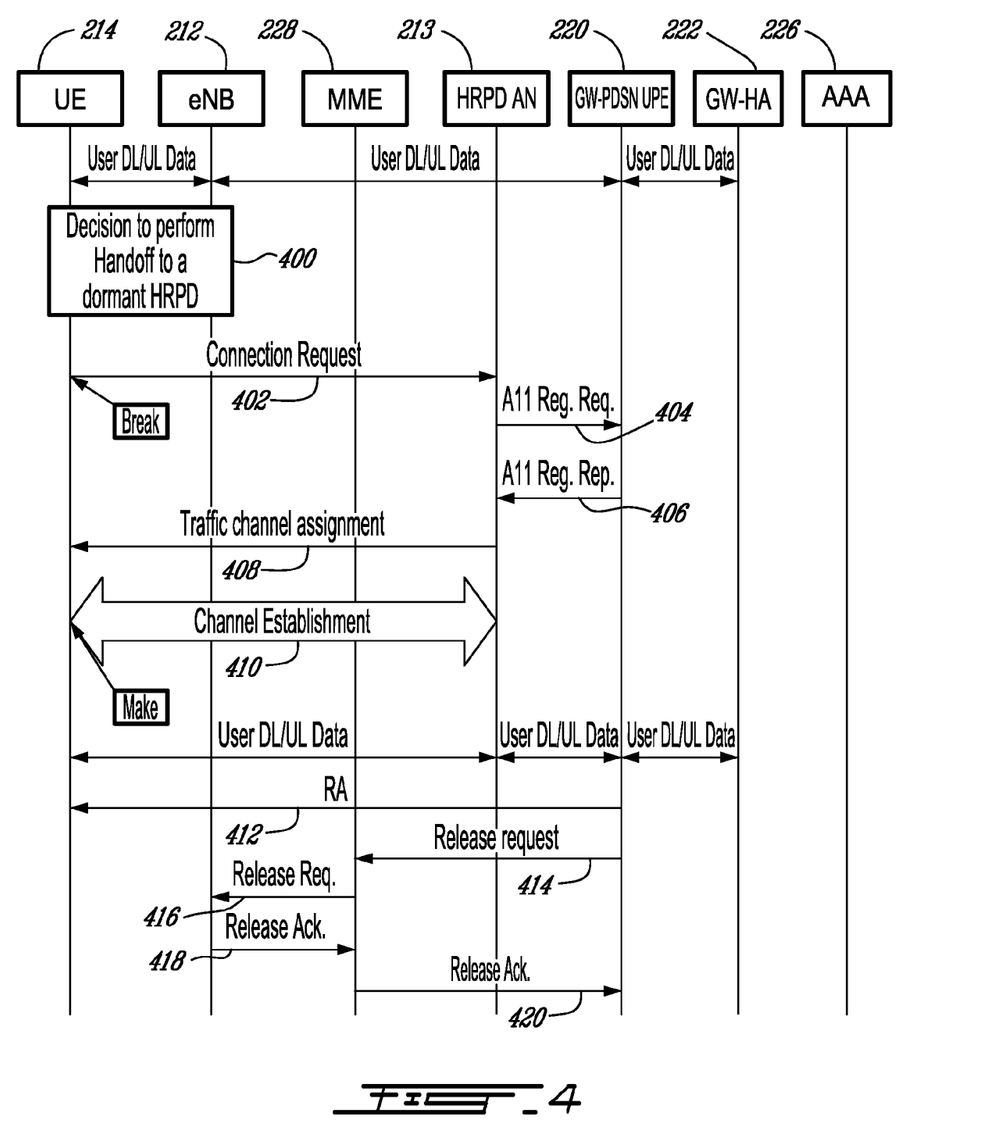
FIG. 4 illustrates signaling associated with a handoff of a UE from an LTE RAN to an HRPD RAN according to another exemplary embodiment.

Having described an exemplary embodiment wherein a hard handoff is performed in the LTE-to-HRPD direction for a UE 214 which is idle (no PPP connection established) in the HRPD RAN 202, next an exemplary embodiment wherein a hard handoff is performed in the LTE-to-HRPD direction for a UE 214 which is dormant (i.e., has an existing PPP connection in the GW-PDSN UPE 220 but no current traffic channel with an HRPD AN 213) in the HRPD RAN 202 will be described in conjunction with FIG. 4. Therein, at block 400, a decision is made to handoff the UE 214 from the LTE RAN 204 to the HRPD RAN 202, e.g., when a packet zone boundary is crossed. Thus, the eNB 212/MME 228 has, according to this exemplary embodiment, the capability to inform the UE 214 if the routing area boundaries associated with the LTE portion of the hybrid system 200 are also the HRPD subnet boundaries such that the UE 214 can then determine when to initiate the handoff. For example, the eNB 212 can be provided with static provisioning (i.e., configuration data) about neighbor cells and can broadcast that information to the UEs 214, which information can include, according to these exemplary embodiments, information regarding neighboring HRPD cells. In this exemplary embodiment, the UE 214 then directly requests a connection with the HRPD AN 213 (message 402) which triggers the resulting A10 connection establishment via A11 registration request (message 404) and A11 registration response (message 406). An HRPD traffic channel is then assigned to the UE 214 as shown by traffic channel assignment 408 and channel establishment 410 signaling.

The UE 214 is now connected to the HRPD RAN 202 and can transmit and receive uplink and downlink traffic, respectively. The handoff is then completed by sending a router advertisement message 412 to the UE 214 that includes the same prefix used over the previous LTE connection. A release request message 414 is sent from the GW-PDSN UPE 220 to release the UPE context to the MME 228 which in turn sends a request 416 to the eNB 212 to release its resources associated with the previous LTE system connection to this UE 214. Acknowledgements of the release messages 414 and 416 are shown in FIG. 4 as messages 420 and 418, respectively. According to this exemplary embodiment, the UE 214 does not involve the eNB 212 to which it is connected in performing the handoff, but instead communicates directly with the HRPD AN 213.

Figure 5:
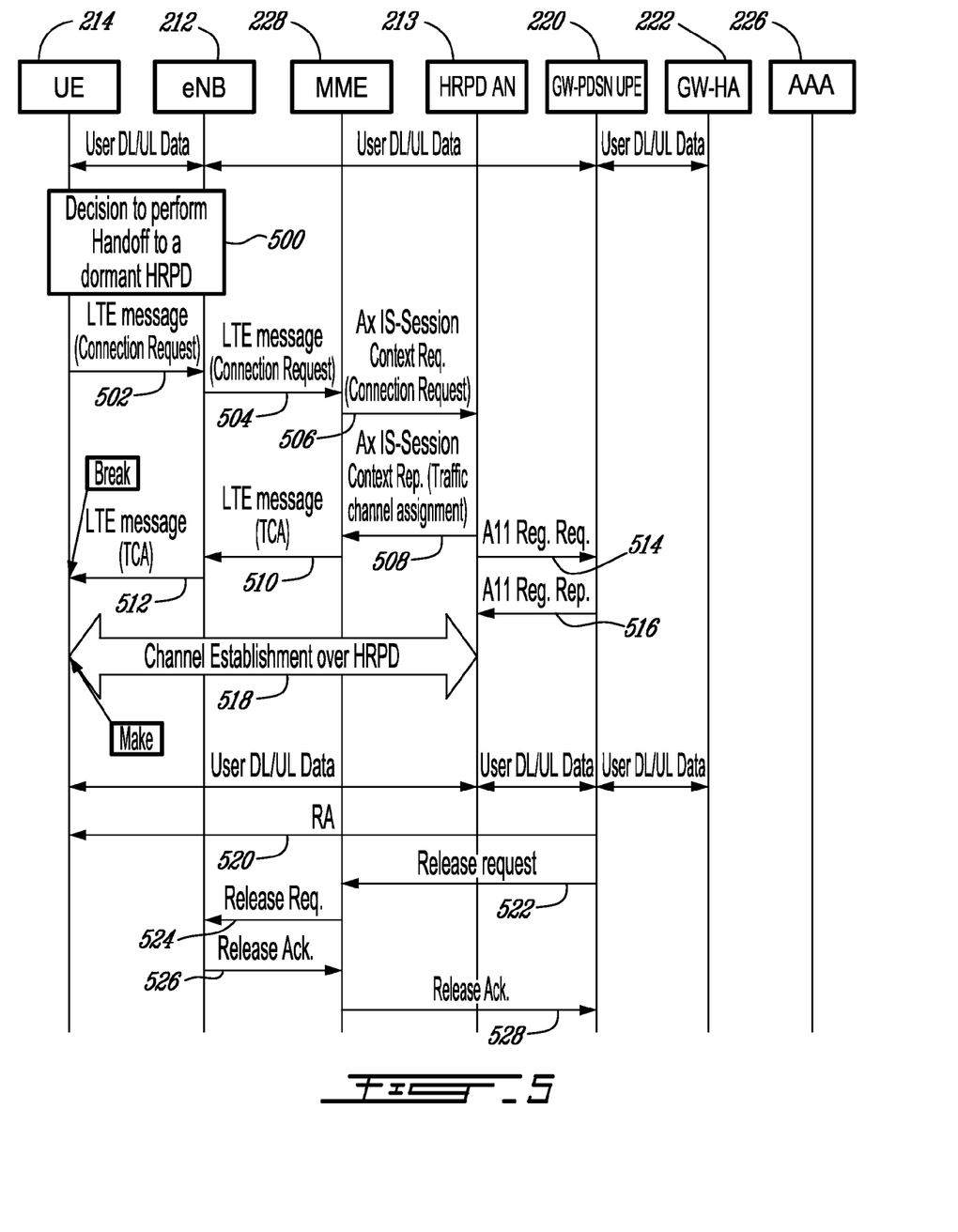
FIG. 5 illustrates signaling associated with a handoff of a UE from an LTE RAN to an HRPD RAN according to yet another exemplary embodiment.

However, according to another exemplary embodiment, shown in FIG. 5, the UE 214 can instead use the LTE RAN portion of the hybrid system 200 to initiate a connection request to the HRPD portion of the system for handing off a UE 214 having a dormant HRPD connection. Therein, at block 500, a decision is made to handoff the UE 214 from the LTE RAN 204 to the HRPD RAN 202, e.g., when a packet zone boundary is crossed. Thus, the eNB 212/MME 228 has, according to this exemplary embodiment, the capability to inform the UE 214 if the routing area boundaries associated with the LTE portion of the hybrid system 200 are also the HRPD subnet boundaries such that the UE 214 can then determine when to initiate the handoff. Next, as shown by messages 502 and 504, the HRPD connection request message is encapsulated in an LTE message which is sent from the UE 214 to the eNB 212 and on to the MME 228, respectively. The MME 228 then sends the encapsulated connection request message to the HRPD AN 213, e.g., using the new Ax interface or as a modification to an existing interface such as the A21 interface, via message 506.

The HRPD AN 213 then uses the same tunneling mechanism to return a traffic channel assignment (TCA) message back to the MME 228. The encapsulated TCA message is forwarded on to the eNB 212 and the UE 214 via messages 512 and 510, respectively. In parallel with the assignment of an HRPD traffic channel, an A10 connection is setup using A11 registration signals 514 and 516 to and from the GW-PDSN UPE 220, respectively. As indicated by reference numeral 518, the UE 214 may then tune to the HRPD frequency associated with the assigned traffic channel to complete the transition to the HRPD RAN 202 whereupon uplink and downlink data can be transferred thereover. The GW-PDSN UPE 220 sends an RA message with the same prefix used over the LTE connection to the UE 214 as message 520 and the various LTE resources may then be released as shown by messages 522-528. As compared to the exemplary embodiment of FIG. 4, the exemplary embodiment of FIG. 5 provides a reduced "break-to-make" time because the UE 214 remains connected to the LTE RAN 204 during the time that handoff resources, e.g., the HRPD traffic channel and the A10 connection, are being reserved/assigned.

Figure 6:
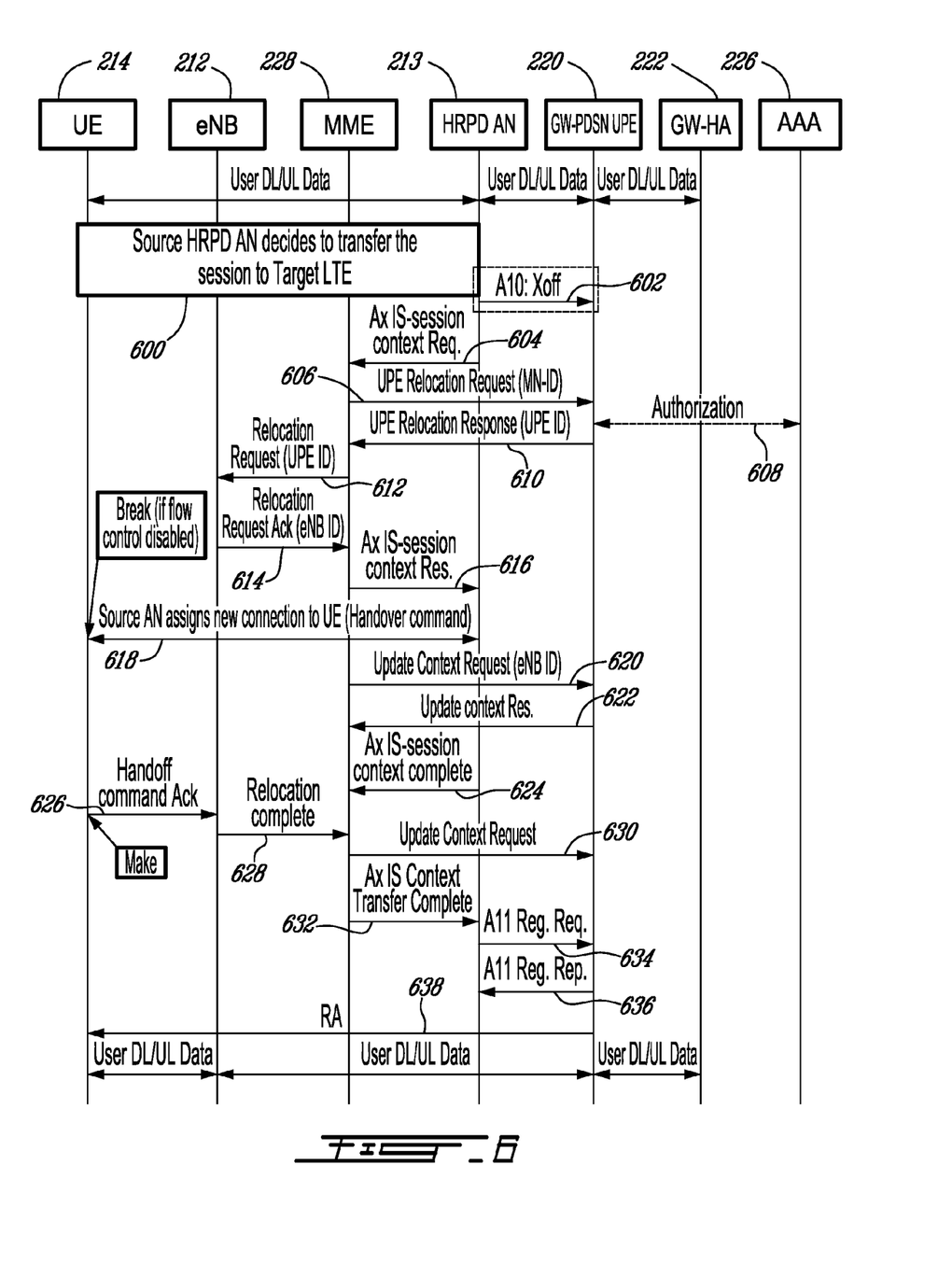
FIG. 6 illustrates signaling associated with a handoff of a UE from an HRPD RAN to an LTE RAN according to an exemplary embodiment.

Having described handoffs according to exemplary embodiments in the LTE-to-HRPD direction, an exemplary embodiment of handoff in the opposite direction, i.e., from the HRPD RAN 202 to the LTE RAN 204 will now be described beginning with a discussion of FIG. 6. Therein, at step 600, the source HRPD AN 213 decides to perform an inter-system hard handoff based on, for example, information received from the UE 214. As shown by signal 602, the HRPD AN 213 may optionally request the GW-PDSN UPE 220 to stop data transmission if flow control is enabled. It will be appreciated that if this latter feature is used, then the break-to-make time will be increased, since the UE 214 cannot transmit data until it has been successfully handed off to LTE portion of the hybrid system 200. If, on the other hand, this feature is deactivated and message 602 is not sent, then the UE 214 can continue to transmit data over the HRPD portion of the hybrid system 200 until a handoff command is received at step 618, therefore reducing the break-to-make time.

Regardless of whether the flow control message 602 is sent or not, the handoff process will continue with the HRPD AN 213 sending an Ax IS-session context request message 604 to the MME 228 to initiate the handoff. This message can include, for example, some or all of the following information elements: an ID associated with the UE 214 (MN-ID), serving GW identifier (e.g., an IP address associated with the GW 220 to allow the same GW 220 to be used pre- and post-handoff), an inter-GW handoff address (e.g., an IP address to be used for inter-GW handoff tunnel establishment if the currently serving GW 220 is not available for use post-handoff), an inter-system source access network identifier (ISSANI, e.g., used by the GW 220 to determine if re-authentication of the user is necessary), user equipment capabilities, session status (e.g., information which indicates a session state in the source network such as "LTE active" or "HRPD dormant"), and security status (information which indicates that the UE 214 has been authenticated and may be used by the GW 220 to request authorization information from the AAA 226 at A11 establishment). Since the target LTE eNB 212 is selected by the MME 228 rather than the HRPD AN 213, the target cell identifier would typically not be included in this message 604. Additionally, as mentioned above, instead of using a new Ax interface, the message 604 or its associated one or more of the aforelisted information elements can be transferred via modifications to an existing interface, e.g., the A21 interface.

Messages 604-614 illustrate the procedures used to perform the relocation in the target LTE system 204 according to this exemplary embodiment. The UPE Relocation Request 606 includes, for example, the MN-ID, security status, the inter-system source Access Network Identifier which can be used by the GW-PDSN UPE 220 to determine if an intra-GW hard handoff has occurred. If so, the GW-PDSN UPE 220 may then take appropriate actions such as maintaining the ROHC parameters (i.e., no need to negotiate those parameters over HRPD), maintaining the IPv6 prefix or the CoA, so no MIP registration procedure is required by the UE 214, and/or moving IP and user context information over the new connection. Based on the security status information and the inter-system source Access Network Identifier, the GW-PDSN UPE 220 may initiate an optional authorization request (message 608) and obtain user profile information to indicate authorization information on the new access type. Relocation response information, including the identity of the GW-PDSN UPE 220, is then forwarded to the eNB 212 via MME 228 (signals 610 and 612). In response, the target eNB 212 replies with a request acknowledgement signal 614 including its identity.

Once the relocation information has been determined, e.g., the identity of the target eNB 212 which will support radio communications with the UE 214 after the handoff, the MME 228 sends an Ax IS-Session Context Reply 616 to the originating HRPD AN 213 indicating that it accepts the handoff and includes the handoff command message that will be transmitted to the UE 214 encapsulated over the HRPD radio channel. Then, the HRPD AN 213 can send this handoff command to the UE 214 as shown by signalling 618 and the handoff is commenced. Messages 620 and 622 can be transmitted in parallel with the signalling of messages 616 and 618 and serve to provide the GW-PDSN UPE 220 with the identity of the target eNB 212 and to establish a tunnel between eNB 212 and GW-PDSN UPE 220. Message 624 acknowledges message 616 and, at that time, the handoff is completed and acknowledged by the UE 214 (message 626). Resources can then be released in the source HRPD network and the MME 228 may notify the GW-PDSN UPE 220 when the UE 214 is successfully connected to the new channel via messages 626-636. A router advertisement message 638 is sent from the GW-PDSN UPE 220 to the UE 214 with the same prefix used over the LTE access and the UE 214 will transmit and receive traffic via the LTE RAN 204.

Separated PDSN and SAE Gateway

Figure 7:
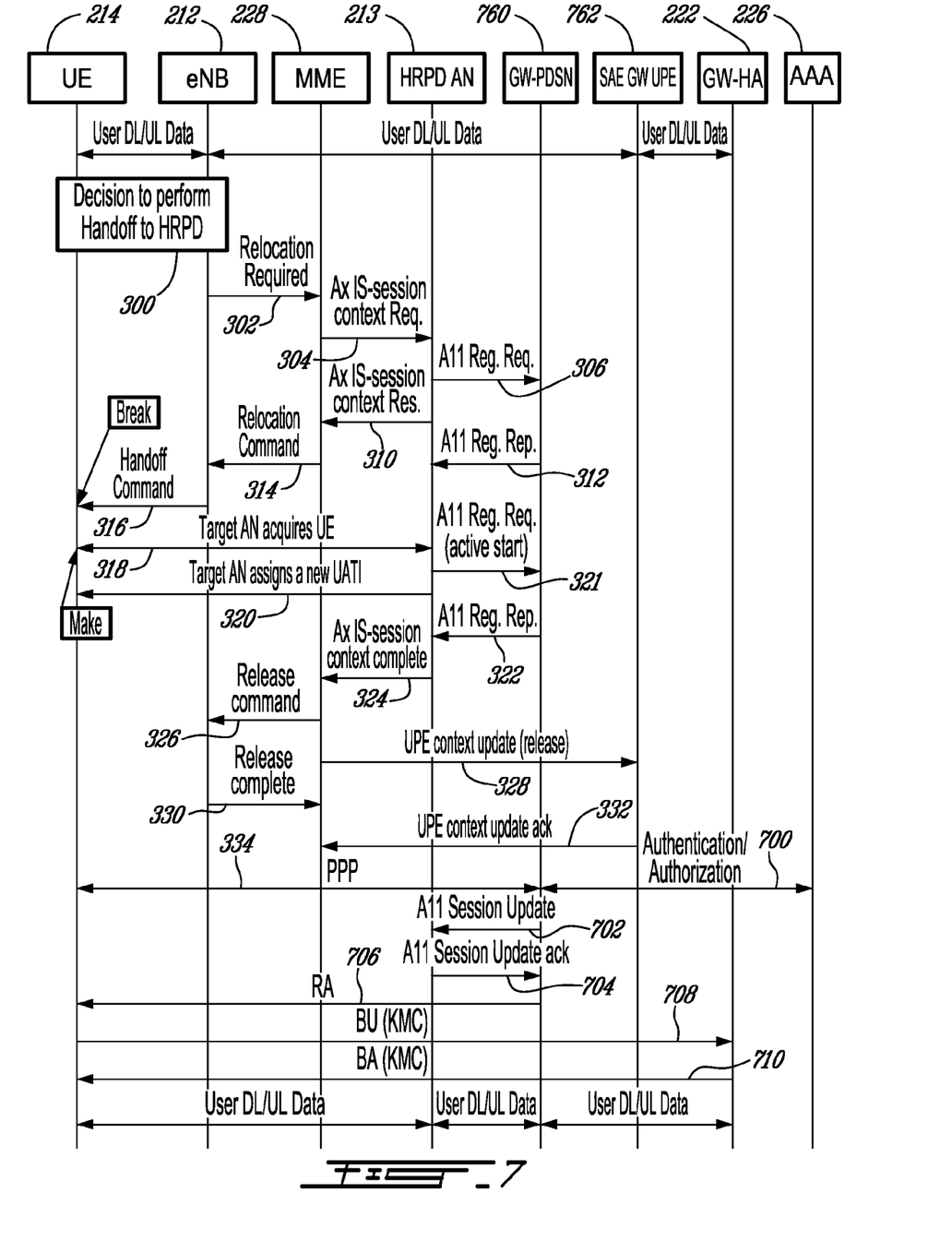
FIGS. 7 and 8 depict handoff signaling associated with exemplary embodiments wherein a packet data serving node (PDSN) and system architecture evolution gateway (SAE-GW) are separate nodes.

In the foregoing exemplary embodiments, the PDSN node associated with the HRPD portion of the hybrid network and the SAE Gateway node associated with the LTE portion of the hybrid network were integrated together into a single node. However, handoffs according to these exemplary embodiments are not limited to such architectures and can be employed in hybrid HRPD/LTE systems wherein the PDSN and the SAE Gateway are independent. FIG. 7 illustrates a signaling flow according to such an exemplary embodiment, where the PDSN 760 and the SAE Gateway 762 are separate nodes, for a hard handoff from the LTE portion of the system to the HRPD portion of the system. Many of the signals used in this exemplary embodiment are the same as those described above for the integrated PDSN/SAE Gateway embodiment of FIG. 3 and, for those signals which are the same, the same reference numerals are used in FIG. 7 and the above-description of those signals is incorporated here by reference.

There are, however, some differences which bear further description. For example, message 308 shown in FIG. 3 relating to an optional authorization is omitted in FIG. 7. Unlike the intra-GW scenario of FIG. 3, the PDSN 760 may not initiate an authorization request after message 306 because the context for the UE 214 which is being handed off is in a different GW, i.e., the LTE's SAE GW UPE 762. Thus, the subscriber QoS profile will only be received by the PDSN 760 during PPP establishment at step 334. Then the PDSN 760 can request authorization of the UE 214 at message 700 after message 334. Additionally, since the PDSN 760 doesn't have the QoS profile until this time in the Layer 2 handoff signalling process, another set of A11 messages 702 and 704 are then exchanged between the PDSN 760 and the HRPD AN 213 to provide the radio network with the subscriber's QoS profile. At this time, Layer 3 signalling, e.g., as described in the above-incorporated by reference patent application, may be performed.

The RA message 706 is sent to the UE 214 and includes a new prefix (since it is a different gateway than node 762 which was previously controlling communications with that device). The UE 214 sends a binding update (BU) with Key Management Configuration (KMC) flag set as message 708. The GW HA 222 updates the IKE SA and the mobility bindings (to now know that the UE is communicating via the target gateway) and sends a binding acknowledgement (BA) with KMC flag set to indicate that the IKE SA update is done. The user data path is now switched to the new CoA and uplink and downlink traffic can now be sent over the HRPD traffic channel.

Figure 8:
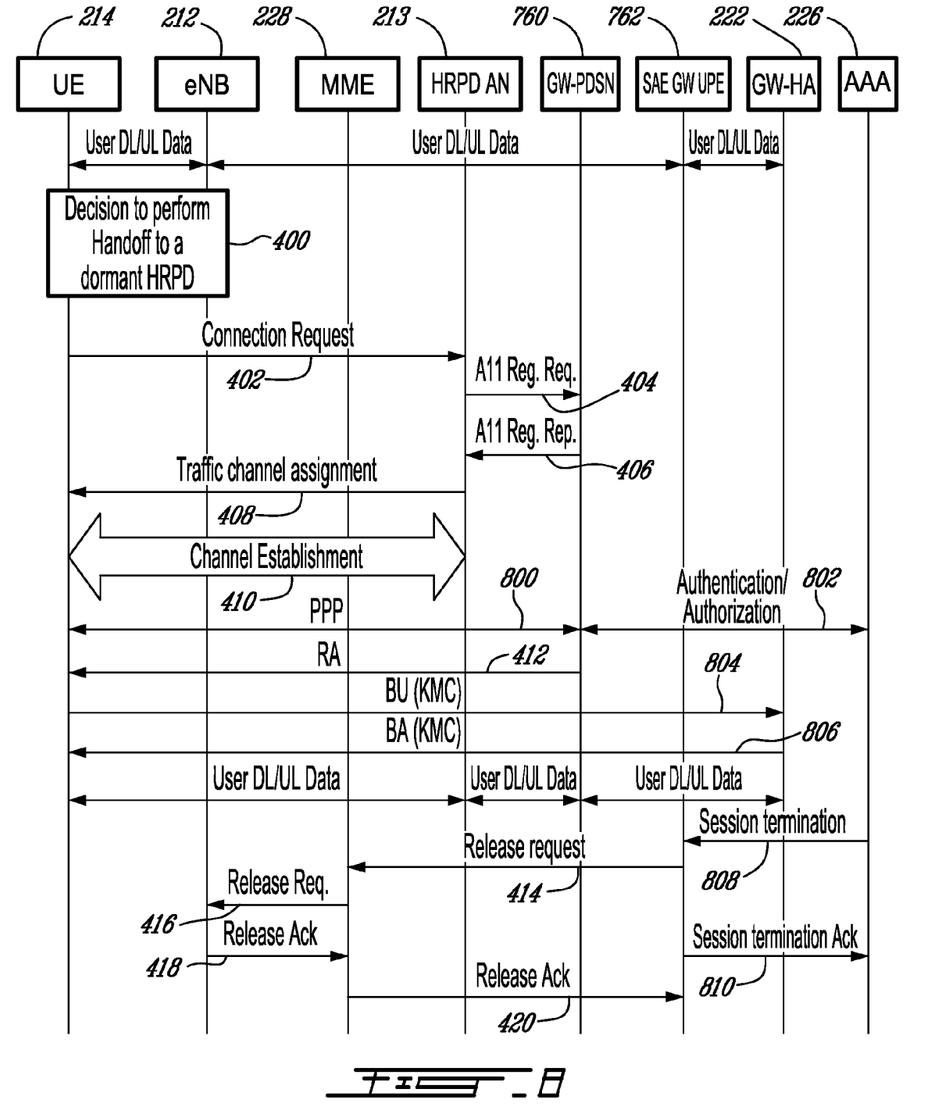

FIG. 8 illustrates Layer 2 signaling associated with a handoff from a UE which is initially connected to the LTE RAN 204 to the HRPD portion of the hybrid system 200, wherein the UE has a dormant connection in the HRPD RAN 202. Thus, this exemplary embodiment is similar to that described above with respect to FIG. 4 wherein similar messages/signals have the same reference numerals and their descriptions are incorporated herein by reference. Since the PDSN 760 and SAE-GW UPE 762 are separate entities there are, however, some differences. For example, after the identity of the target PDSN 760 is determined (i.e., after establishment of the A10 connection via signals 404 and 406), authentication/authorization of the UE 214 can be performed via message 802. A binding update 804 and corresponding acknowledgement 806 are also performed with the GW HA 222. Similarly, session termination signals 808 and 810 are provided to terminate the LTE session with AAA 226 after the handoff.

Figure 9:
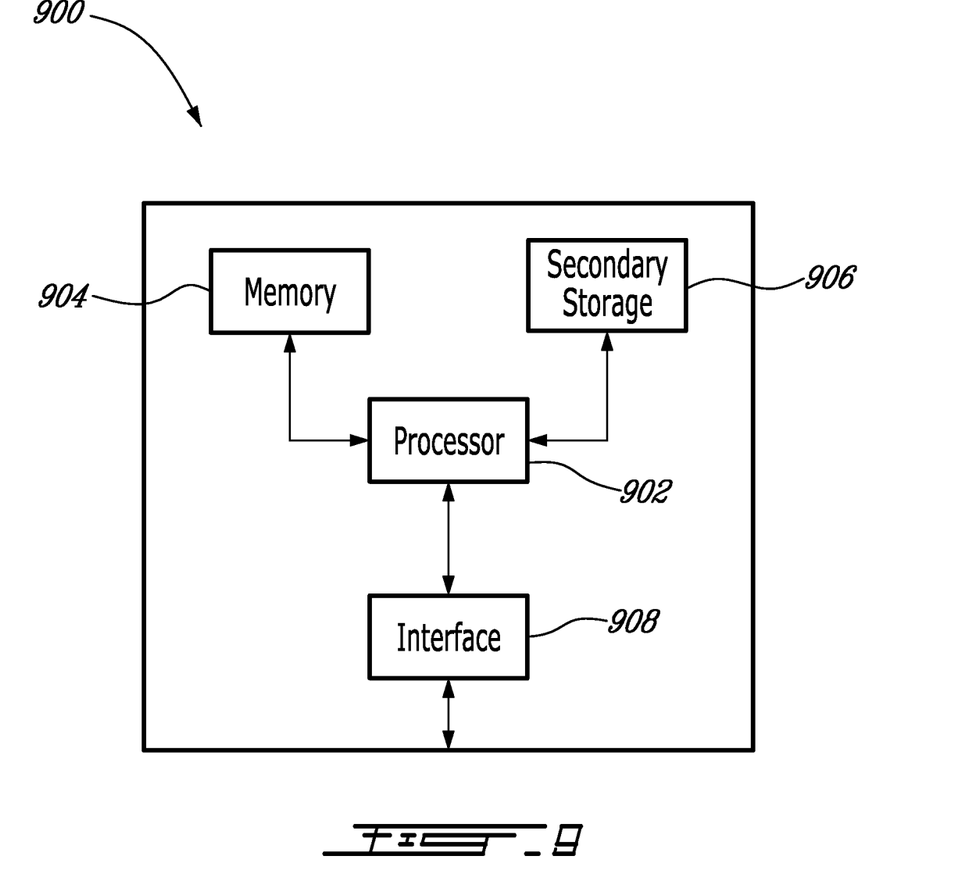
FIG. 9 illustrates a server as an exemplary communication node according to an exemplary embodiment.

The foregoing exemplary embodiments describe Layer 2 signaling associated with handoffs between HRPD and LTE systems. Various communication nodes are described as being involved in the signaling. These nodes can, for example, be implemented as servers, an example of which is illustrated in FIG. 9. Server 900 can contain a processor 902 (or multiple processor cores), memory 904, one or more secondary storage devices 906 and an interface unit 908 to facilitate communications between network communication node 900 and the rest of the network. Additionally, the server 900 can contain link layer or Layer 2 protocol handling software to enable it to operate as, for example, an MME 228, HRPD AN 213 or gateway node 220, as described above.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. An access node of a high rate packet data (HRPD) network, used in performing a User Equipment (UE) hard handoff from a long term evolution (LTE) network to the HRPD network, the access node comprising:
   a processor adapted for receiving a request for the UE hard handoff, and for sending, in response to receipt of the request for the UE hard handoff and prior to the UE breaking a radio connection with the LTE network, a registration request message to a Packet Data Service Node (PDSN), the registration request message requesting establishment of an A10 connection for the UE in the HRPD network and including information determined in accordance with the received request for hard handoff for use by the PDSN in a determination that the authentication of the UE in the HRPD network can be avoided to reduce a break-to-make delay between breaking of the radio connection between the UE and the LTE network and the making of an A10 connection between the UE and the HRPD network.

2. The access node of claim 1, wherein the information determined in accordance with the received request for hard hand off includes an IP address associated with a gateway node, to allow the use of the same gateway after the handoff.

3. The access node of claim 1, wherein the information determined in accordance with the received request for hard hand off includes an inter-system source access network identifier.

4. The access node of claim 1, wherein the information determined in accordance with the received request for hard hand off includes security status information indicative that the UE has been already authenticated in the LTE network.

5. The access node of claim 1, wherein the information determined in accordance with the received request for hard hand off is explicitly contained in the received request for hard hand off.

6. A method for performing a User Equipment (UE) hard handoff from a long term evolution (LTE) network to a high rate packet data (HRPD) network, the method comprising the steps of:
   responsive to a request for the UE handoff received in an access node of the HRPD network, at a Gateway Packet Data Service Node (GW-PDSN) of the HRPD network, prior to the UE breaking a radio connection with the LTE network, receiving a registration request message for requesting an establishment of an A10 connection for the UE in the HRPD network, the registration request message including information determined in accordance with the request for the UE handoff for use in a determination that authentication of the UE in the HRPD network can be avoided; and
   in response to a determination that authentication of the UE in the HRPD network is not necessary, the determination made in accordance with the information included in the registration request message, initiating the establishment of the A10 connection for the UE without authenticating the UE in the HRPD network to reduce a break-to-make delay between breaking of the radio connection between the UE and the LTE network and the making of an A10 connection between the UE and the HRPD network.

7. The method as claimed in claim 6, wherein the information included in the registration message includes at least one of:
   (a) an IP address associated with a gateway node, to allow the use of the same gateway after the handoff,
   (b) an inter-system source access network identifier, and
   (c) security status information indicative that the UE has been already authenticated in the LTE network.

8. The method as claimed in claim 6, wherein the information comprises one or more of the following elements:
   (a) an IP address associated with a gateway node, to allow the use of the same gateway after the handoff,
   (b) an inter-system source access network identifier, and
   (c) security status information indicative that the UE has been already authenticated in the HRPD network.

9. A Gateway Packet Data Service Node (GW-PDSN) of a high rate packet data (HRPD) network, used in performing a User Equipment (UE) hard handoff from a long term evolution (LTE) network to the HRPD network, the GW-PDSN node comprising:
   a processor adapted for receiving, from an access node prior to the UE breaking a radio connection with the LTE network, a registration request message for requesting establishment of an A10 connection for the UE in the HRPD network, the registration request message including information determined by the access node for use in a determination that authentication of the UE in the HRPD network can be avoided, for determining in accordance with the information included in the request message that authentication of the UE in the HRPD network is not necessary, and for initiating, in accordance with said determination, establishment of the A10 connection for the UE without authentication of the UE in the HRPD network to reduce a break-to-make delay between breaking of the radio connection between the UE and the LTE network and the making of an A10 connection between the UE and the HRPD network.

10. The GW-PDSN node as claimed in claim 9, wherein the information included in the request message includes at least one of:
   (a) an IP address associated with a gateway node, to allow the use of the same gateway after the handoff,
   (b) an inter-system source access network identifier, and
   (c) security status information indicative that the UE has been already authenticated in the LTE network.

11. A method for performing a User Equipment (UE) hard handoff from a high rate packet data (HRPD) network to a long term evolution (LTE) network, the method comprising the steps of:
- responsive to a request for the UE handoff, receiving at a Gateway Packet Data Service Node (GW-PDSN) of the LTE network, a request message comprising information for avoiding authentication of the UE in the LTE network during said handoff;
- using the information at the GW-PDSN to initiate establishment of a data session for the UE without authenticating the UE in the LTE network to reduce a break-to-make delay between breaking a radio connection between the UE and the HRPD network, and establishing a session between the UE and the LTE network.

12. A Gateway Packet Data Service Node (GW-PDSN) of a high rate packet data (HRPD) network, used in performing a User Equipment (UE) hard handoff from a high rate packet data (HRPD) network to a long term evolution (LTE) network, the GW-PDSN node comprising:
- a processor adapted for receiving, responsive to a request for the UE handoff, a request message comprising information for avoiding authentication of the UE in the LTE network during said handoff;
- using the information by the GW-PDSN to initiate an establishment of a data session for the UE without re-authenticating the UE in the LTE network to reduce a break-to-make delay between breaking a radio connection between the UE and the HRPD network, and establishing a session between the UE and the LTE network.

13. The GW-PDSN node as claimed in claim 12, wherein the information includes at least one of:
- (a) an IP address associated with a gateway node, to allow the use of the same gateway after the handoff,
- (b) an inter-system source access network identifier, and
- (c) security status information indicative that the UE has been already authenticated in the HRPD network.

14. A method for performing a User Equipment (UE) hard handoff from a long term evolution (LTE) network to a high rate packet data (HRPD) network, the method comprising:
- responsive to receipt, at an access node of the HRPD network, of a request for hard hand off of the UE, and prior to the UE breaking a radio connection with the LTE network, transmitting from the access node to a Packet Data Service Node (PDSN) in the HRPD network, a registration request message requesting establishment of an A10 connection for the UE in the HRPD network, the registration request message including information determined in accordance with the received request for hard handoff, for use by the PDSN in a determination that the authentication of the UE in the HRPD network can be avoided to reduce a break-to-make delay between breaking of the radio connection between the UE and the LTE network and the making of an A10 connection between the UE and the HRPD network.

15. The method of claim 14, wherein the information determined in accordance with the received request for hard hand off includes an IP address associated with a gateway node, to allow the use of the same gateway after the handoff.

16. The method of claim 14, wherein the information determined in accordance with the received request for hard hand off includes an inter-system source access network identifier.

17. The method of claim 14, wherein the information determined in accordance with the received request for hard hand off includes security status information indicative that the UE has been already authenticated in the LTE network.

18. The method of claim 14, wherein the information determined in accordance with the received request for hard hand off is explicitly contained in the received request for hard hand off.

* * * * *